US009762283B2

(12) United States Patent
Chen et al.

(10) Patent No.: US 9,762,283 B2
(45) Date of Patent: Sep. 12, 2017

(54) METHOD AND APPARATUS FOR ANTENNA CALIBRATION

(75) Inventors: Jia Chen, Sichuan (CN); Youping Su, Solna (SE); Min Wei, Sichuan (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 21 days.

(21) Appl. No.: 14/427,026

(22) PCT Filed: Sep. 13, 2012

(86) PCT No.: PCT/CN2012/081324
§ 371 (c)(1),
(2), (4) Date: Jun. 25, 2015

(87) PCT Pub. No.: WO2014/040250
PCT Pub. Date: Mar. 20, 2014

(65) Prior Publication Data
US 2016/0020817 A1    Jan. 21, 2016

(51) Int. Cl.
*H04B 1/48* (2006.01)
*H04B 1/56* (2006.01)
(Continued)

(52) U.S. Cl.
CPC ............... *H04B 1/48* (2013.01); *H04B 1/56* (2013.01); *H04B 17/12* (2015.01); *H01Q 3/267* (2013.01);
(Continued)

(58) Field of Classification Search
None
See application file for complete search history.

(56) References Cited

U.S. PATENT DOCUMENTS 6,259,933 B1 * 7/2001 Bambridge ............. H01Q 1/02
343/702
6,496,140 B1    12/2002 Alastalo
(Continued)

FOREIGN PATENT DOCUMENTS

CN    1815914    8/2006
CN    1830159    9/2006
(Continued)

OTHER PUBLICATIONS

Extended European Search Report for Application No. / Patent No. 12884534.4—1855 / 2896137 PCT/CN2012081324—Mar. 16, 2016.
(Continued)

*Primary Examiner* — Ayaz Sheikh
*Assistant Examiner* — Tarell Hampton
(74) *Attorney, Agent, or Firm* — Baker Botts, LLP (57) ABSTRACT

Method and apparatus for antenna calibration have been disclosed. A radio unit (510) is provided. The radio unit (510) may comprise: a plurality of transmit/receive (TX/RX) paths; a plurality of radio frequency (RF) ports (512) connected with the plurality of TX/RX paths; and a coupling unit (516), coupled with the plurality of TX/RX paths and configured to inject an uplink (UL) calibration signal (550) into at least one of the plurality of TX/RX paths and extract a downlink (DL) calibration signal (540) from at least one of the plurality of TX/RX paths. A normal TX/RX path may be reused both for antenna calibration and antenna supervision. Thus, a low cost hardware solution for antenna calibration is provided. An AIR base station (500) comprising such radio unit (510) is also provided.

12 Claims, 6 Drawing Sheets

(51) Int. Cl.
*H04B 7/04* (2017.01)
*H01Q 3/26* (2006.01)
*H04B 17/12* (2015.01)
*H04B 17/14* (2015.01)
*H04B 17/21* (2015.01)

(52) U.S. Cl.
CPC ............... *H04B 7/04* (2013.01); *H04B 17/14* (2015.01); *H04B 17/21* (2015.01)

(56) References Cited

U.S. PATENT DOCUMENTS

| | | | | |
|---|---|---|---|---|
| 6,603,810 | B1* | 8/2003 | Bednekoff | H04B 17/318 375/228 |
| 8,532,598 | B1* | 9/2013 | Breslin | H04B 17/11 455/209 |
| 2006/0009162 | A1* | 1/2006 | Tan | H01Q 3/267 455/67.11 |
| 2006/0172712 | A1* | 8/2006 | Sievenpiper | H04B 7/0814 455/101 |
| 2006/0192710 | A1 | 8/2006 | Schieblich | |
| 2007/0149251 | A1 | 6/2007 | Jeon | |
| 2007/0176843 | A1* | 8/2007 | Qureshi | G06F 1/1616 343/873 |
| 2008/0012748 | A1 | 1/2008 | Ahn | |
| 2009/0085815 | A1* | 4/2009 | Jakab | H01Q 1/243 343/702 |
| 2012/0309325 | A1* | 12/2012 | Carbone | H04B 1/40 455/73 |

FOREIGN PATENT DOCUMENTS

| | | |
|---|---|---|
| CN | 101383647 | 3/2011 |
| CN | 102624471 | 8/2012 |

OTHER PUBLICATIONS

PCT Notification of Transmittal of the International Search Report and the Written Opinion of the International Searching Authority, or the Declaration for International Application No. PCT/CN2012/081324, filed Jun. 6, 2013.

First Office Action issued by Chinese Patent Office for Application No. 2012800757824 (English Summary of Office Action attached)—dated Mar. 22, 2017.

* cited by examiner

METHOD AND APPARATUS FOR ANTENNA CALIBRATION

PRIORITY

This nonprovisional application is a U.S. National Stage Filing under 35 U.S.C. §371 of International Patent Application Serial No. PCT/CN2012/081324 filed Sep. 13, 2012, and entitled "METHOD AND APPARATUS FOR ANTENNA CALIBRATION".

FIELD OF THE INVENTION

Embodiments of the present invention generally relate to communication systems, and more particularly to a method, a radio unit, and a base station for calibrating an antenna array within a base station.

BACKGROUND OF THE INVENTION

This section introduces aspects that may help facilitate a better understanding of the invention(s). Accordingly, the statements of this section are to be read in this light and are not to be understood as admissions about what is in the prior art or what is not in the prior art.

The abbreviations and terms appearing in the description and drawings are defined as below.
3 GPP Third Generation Partnership Project
AIR Antenna Integrated Radio
BS Base Station
DL Downlink
FDD Frequency Division Duplex
LTE Long Term Evolution
LTE-A Long Term Evolution-Advanced
RMS Root Means Square
RRU Remote Radio Unit
SPDT Single Pole Double Throw
TDD Time Division Duplex
TDSCDMA Time Division-Synchronous Code Division Multiple Access
TOR Transmitter Observation Receiver
UL Uplink
VSWR Voltage Standing Wave Ratio Smart antenna has been one of the most important features in the telecommunication Time Division Duplex (TDD) standards and also starts in Frequency Division Duplex (FDD) standards. A base station can use a smart antenna array to increase its maximum range and capacity due to an improved antenna gain and the reduction of interference from other spatially separated users. Beamforming algorithms often assume that the antenna array has no errors and that the multi-channel transceiver has an identical transfer function. This feature requires "antenna calibration" to make sure that the gain/amplitude and phase of each channel/path can be known and controlled.

Figure 1:
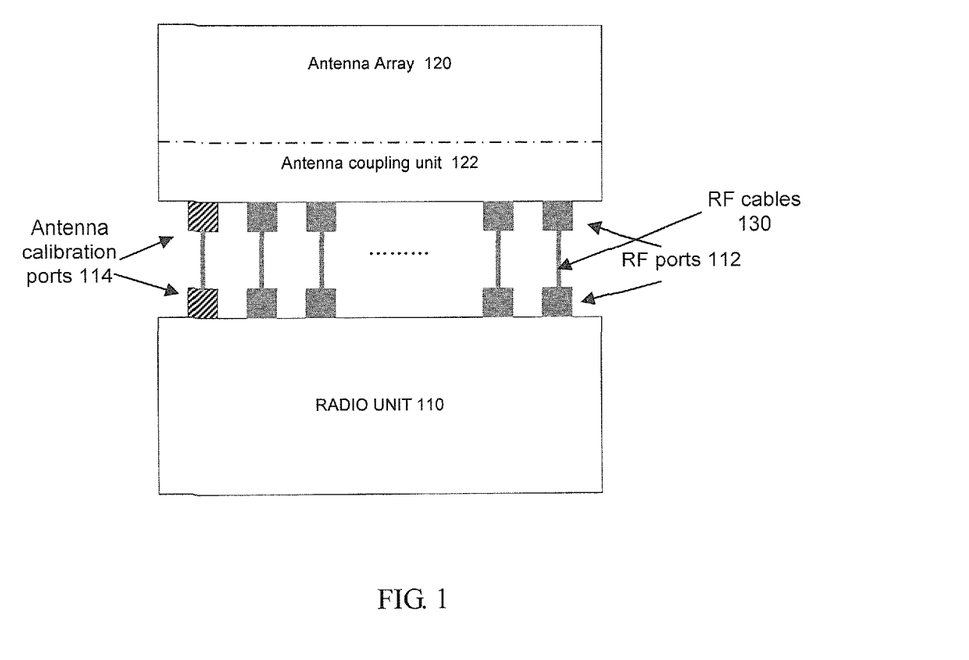
FIG. 1 shows a brief block diagram of a normally used solution for antenna calibration.

FIG. 1 shows a brief block diagram of a normally used solution for antenna calibration. As shown in FIG. 1, there is a radio unit 110, an antenna array 120, and multiple pairs of radio frequency (RF) ports 112 between the radio unit 110 and the antenna array 120. The pairs of RF ports 112 are connected by RF cables 130. The radio unit 110 delivers RF signals via the RF ports 112 to the antenna array 120 for transmitting, and receives via the RF ports 112 RF signals received by the antenna array 120 from the air. The radio unit 110 may comprise multiple transmit/receive (TX/RX) paths/channels (not shown) corresponding to the RF ports 112. Each TX/RX path may include various components for performing signal processing in the RF domain, for example various amplifiers such as low noise amplifier (LNA) or high power amplifier (HPA), digital-to-analog converter (DAC), analog-to-digital converter (ADC), modulator, mixer, and etc.

For calibrating antennas, a pair of RF ports is provided specially for antenna calibration, i.e., antenna calibration ports 114. An antenna coupling unit 122 is arranged within the antenna array 120 to couple calibration signals into/out of the multiple TX/RX paths.

Figure 2:
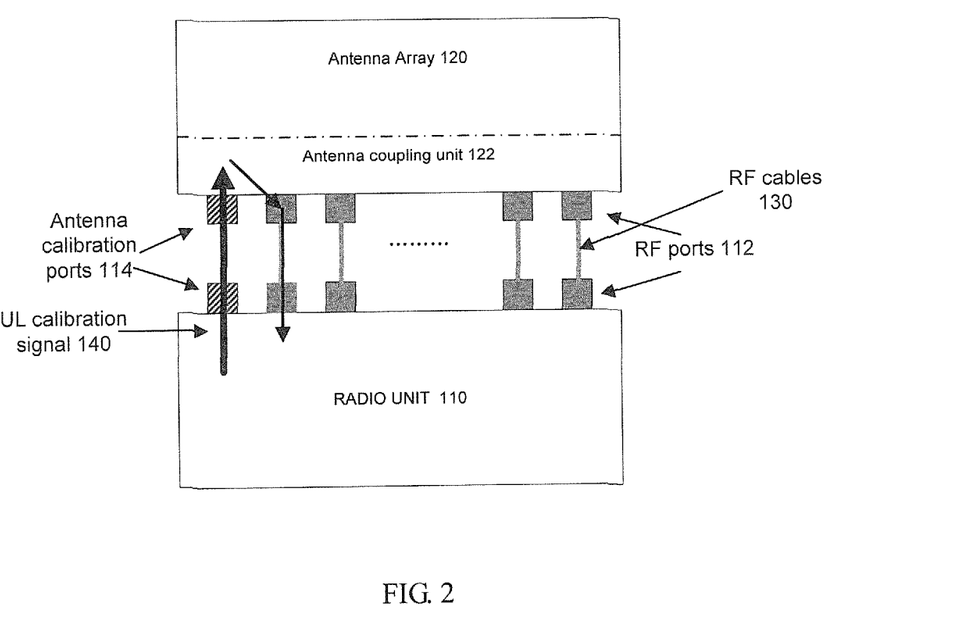
FIG. 2 illustrates the signal flow for uplink (UL) calibration based on the hardware structure in FIG. 1.

FIG. 2 illustrates the signal flow for uplink (UL) calibration based on the hardware structure in FIG. 1. The UL calibration may also be referred as receiver (RX) calibration.

As shown in FIG. 2, a known UL calibration signal 150 is transmitted through the antenna calibration ports 114 to the antenna coupling unit 122. The UL calibration signal may be generated by some device separated from the radio unit 110, for example, a UL calibration signal generator arranged within a baseband unit (not shown). The antenna coupling unit 122 can inject the UL calibration signal into one RX path to be calibrated. Then, the UL calibration signal travels through the RX path and arrives at a RX calibration unit (not shown). The RX calibration unit can process the UL calibration signal and estimate the transfer function of the RX path. The algorithm for estimating the transfer function can be any known algorithm in the art It should be noted that, only one RX path calibration is shown here and other paths are identical. The multiple RX/UL paths may be calibrated simultaneously or sequentially. The antenna calibration ports 114 are served as the common transmitter for all RX paths.

Figure 3:
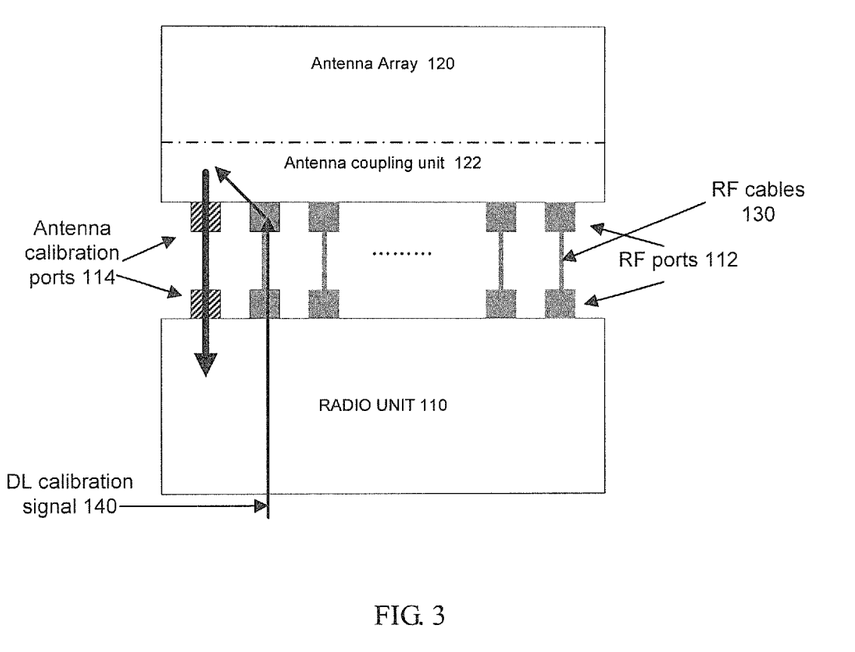
FIG. 3 illustrates the signal flow for downlink (DL) calibration based on the hardware structure in FIG. 1.

FIG. 3 illustrates the signal flow for downlink (DL) calibration based on the hardware structure in FIG. 1. The DL calibration may also be referred as transmitter (TX) calibration.

As shown in FIG. 3, a known DL calibration signal 140 is travelling through one TX path. Similarly, the DL calibration signal may be generated by some device separated from the radio unit 110, for example, a DL calibration signal generator arranged within a baseband unit (not shown). The antenna coupling unit 122 can extract the DL calibration signal from the TX path to be calibrated, and feed it back via the antenna calibration ports 114 to a TX calibration unit (not shown). The TX calibration unit can process the DL calibration signal and estimate the transfer function of the TX path.

It should also be noted that, only one TX path calibration is shown here and other paths are identical. The multiple TX/DL paths may be calibrated simultaneously or sequentially. The antenna calibration ports 114 are served as the common receiver for all TX paths. In other words, the antenna calibration ports 114 act as reference uplink (UL) channel for all DL signals.

In addition, antenna supervision is a very traditionally required feature to detect if the antenna is well connected. Voltage Standing Wave Ratio (VSWR) is normally used for antenna supervision. When a transmission line (cable) is terminated by an impedance that does not match the characteristic impedance of the transmission line, not all of the power is absorbed by the termination. Part of the power is reflected back along the transmission line. The forward (or incident) signal mixes with the reverse (or reflected) signal to cause a voltage standing wave pattern on the transmission line. The ratio of the maximum to minimum voltage is known as VSWR. Thus, in antenna supervision, the forward (or incident) power and the reverse (or reflected) power at the antenna ports will be detected to supervise the connection status between the radio unit and the antenna array.

Figure 4:
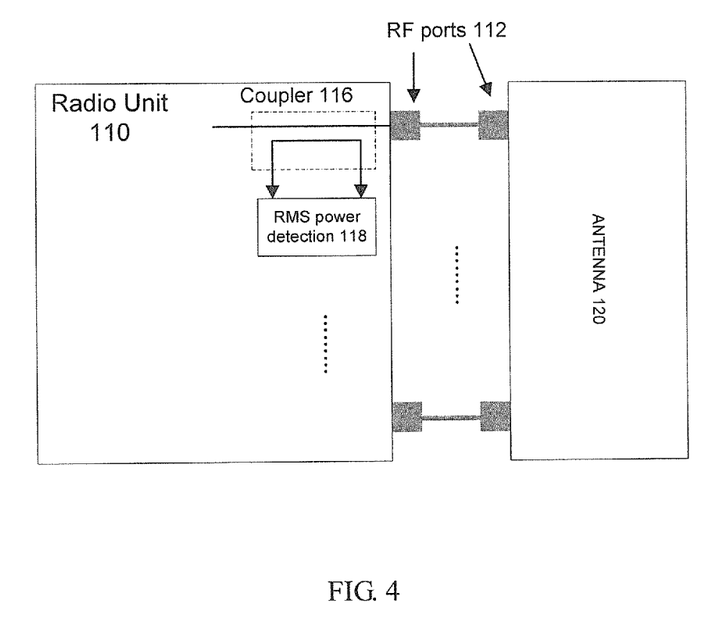
FIG. 4 briefly shows a normally used antenna supervision solution.

FIG. 4 briefly shows a normally used antenna supervision solution. As shown in FIG. 4, a coupler 116 is coupled near the RF port 112 at the radio unit side. The coupler 116 extracts the forward signal and the reverse signal from the transmission line in question to a RMS power detection unit 118. Normally, the RMS power detection unit 118 may be implemented by a simple receiver, which may includes a down-converter, a frequency generation unit and an ADC to make sure that the power can be accurate with the presence of interferers. It should be noted that, only one path configured with a coupler 116 is shown here and other paths are identical.

SUMMARY OF THE INVENTION

As seen from FIGS. 2-4, from a higher system level, the coupling unit 122 in the antenna array 120 is somewhat redundant with the coupler 116 in the radio unit 110. Further, the current antenna calibration solution requires an additional calibration port 114 at both the antenna array side and the radio unit side. Due to the additional calibration port, extra lighting protection may be required because there is usually no cavity filter inside the calibration port for lighting protection, Additionally, traditional "RMS power detection unit" is made by a stand-alone receiver, which costs too much.

Therefore, it would be desirable in the art to provide a low cost hardware solution of antenna calibration. It would also be desirable to provide antenna supervision based on the low cost hardware structure of antenna calibration.

To better address one or more of the above concerns, in a first aspect of the invention, a radio unit is provided. The radio unit may comprise: a plurality of transmit/receive (TX/RX) paths; a plurality of radio frequency (RF) ports connected with the plurality of TX/RX paths; and a coupling unit, coupled with the plurality of TX/RX paths and configured to inject an uplink (UL) calibration signal into at least one of the plurality of RX paths and extract a downlink (DL) calibration signal from at least one of the plurality of TX paths.

In some embodiments, the coupling unit may be further configured to extract transmit signal power from at least one of the plurality of TX paths to supervise a connection status between the radio unit and an antenna array. The transmit signal power may comprise a forward power and a reverse power.

In one embodiment, the coupling unit may comprise a switch array connected to one TX/RX path of the plurality of TX/RX paths, and the one TX/RX path is reused, in a time division manner, for transmitting the UL calibration signal to the coupling unit, receiving the DL calibration signal from the coupling unit, and receiving the extracted transmit signal power from the coupling unit.

In another embodiment, the radio unit may further comprise a stand-alone TX/RX path. The coupling unit may comprise a switch array connected to the stand-alone TX/RX path, and the stand-alone TX/RX path is used for transmitting the UL calibration signal to the coupling unit, receiving the DL calibration signal from the coupling unit, and receiving the extracted transmit signal power from the coupling unit.

In yet another embodiment, when the radio unit is used in a frequency division duplex (FDD) system, it may further comprise a transmitter observation receiver (TOR). The coupling unit may comprise a switch array connected to the TOR and to one TX path of the plurality of TX/RX paths, and the TX path is reused for transmitting the UL calibration signal to the coupling unit, and the TOR is used for receiving the DL calibration signal from the coupling unit and receiving the extracted transmit signal power from the coupling unit.

In some embodiments, the plurality of RF ports is configured to connect to a plurality of RF ports of an antenna array without RF cables.

In a second aspect of the invention, a base station is provided. The base station may comprise a radio unit according to various embodiments of the first aspect of the present invention; and an antenna array having a plurality of RF ports. The plurality of RF ports connected with the RF ports of the radio unit without RF cables.

In a third aspect of the invention, a method for calibrating an antenna array within a base station is provided. The base station may comprise a radio unit, and the radio unit may comprise a plurality of TX/RX paths. A plurality of RF ports connected with the plurality of TX/RX paths, and a coupling unit coupled with the plurality of TX/RX paths. The method may comprise: transmitting a UL calibration signal to at least one of the plurality of RX paths via the coupling unit; receiving a DL calibration signal from at least one of the plurality of TX paths via the coupling unit; and determining, based on at least one of the UL calibration signal and the DL calibration signal, calibration coefficients of the at least one RX path and TX path.

In one embodiment, the UL calibration signal is transmitted to the coupling unit via one TX path of the plurality of TX/RX paths.

In another embodiment, the UL calibration signal is transmitted to the coupling unit via a stand-alone transmitter path.

In one embodiment, the DL calibration signal is transmitted from the coupling unit to one RX path of the plurality of TX/RX paths.

In another embodiment, the DL calibration signal is transmitted from the coupling unit to a stand-alone receiver path.

In a further embodiment, the DL calibration signal is transmitted from the coupling unit to a transmitter observation receiver (TOR).

Particular embodiments of the subject matter described in this specification can be implemented so as to realize one or more of the following advantages.

With particular embodiments of the techniques described in this specification, a low cost hardware solution of antenna calibration is provided by combining the two coupling units. Further, the additional calibration ports may be removed. In some embodiments, a normal TX/RX path may be reused both for antenna calibration and antenna supervision, which further reduces the cost of such solution. In addition, concept of integration of antenna and radio unit is a trend in the TDD and FDD radio base station. The proposed hardware solution is preferably applied in such antenna integrated radio (AIR) base stations.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification.

The disclosed subject matter will now be described with reference to the attached figures. Various structures, systems and devices are schematically depicted in the drawings for purposes of explanation only and so as to not obscure the description with details that are well known to those skilled in the art. The words and phrases used herein should be understood and interpreted to have a meaning consistent with the understanding of those words and phrases by those skilled in the relevant art.

As mentioned previously, from a higher system level, the coupling unit in the antenna array is, to some extent, redundant with the coupler in the radio unit in terms of signal processing. Thus, the basic idea of the present invention is to combine these two coupling units to reduce the redundant components. Specifically, only one coupling unit is arranged within the radio unit. Further, the additional calibration ports may be omitted since the coupling unit is moved to the radio unit and there is no need for the additional calibration ports to deliver calibration signals between the antenna array and the radio unit.

Moreover, in some embodiments, one normal TX path except power amplifier and normal RX path may are reused for antenna calibration, which may be called as a reference path/channel. Also, the RX path can be used as "RMS power detection unit" for VSWR functionality to further reduce the cost of the hardware solution.

The detailed hardware structure of the proposed radio unit and the method for antenna calibration and/or antenna supervision based on the proposed hardware structure will be described with reference to FIGS. 5-10.

Figure 5:
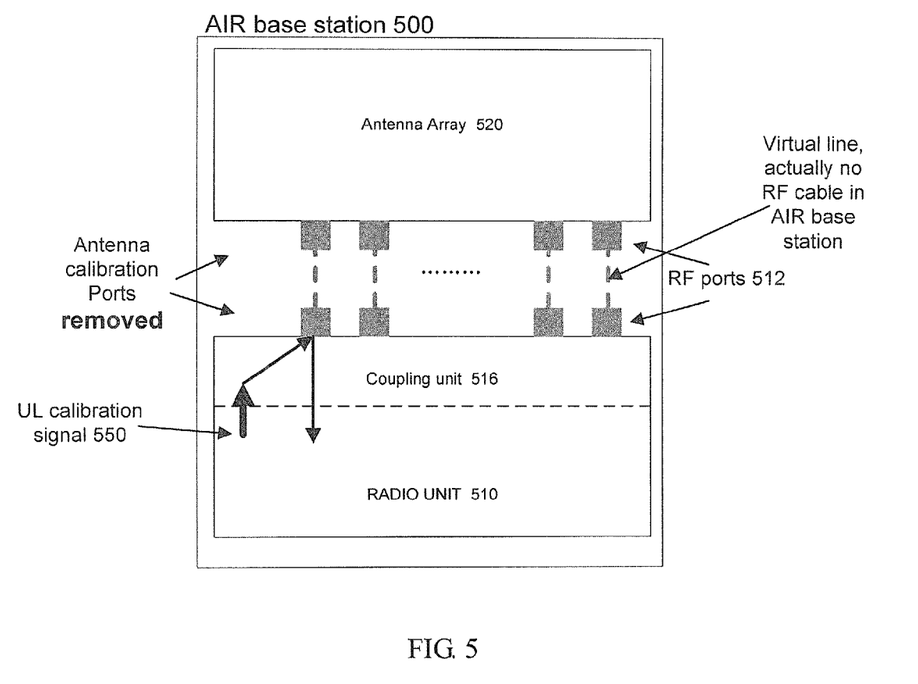
FIG. 5 schematically illustrates an AIR base station 500 and the signal flow for UL calibration based on the hardware structure according to an embodiment of the present invention.

FIG. 5 schematically illustrates an AIR base station 500 and the signal flow for UL calibration based on the hardware structure according to an embodiment of the present invention.

As shown in FIG. 5, the AIR base station 500 may comprise a radio unit 510, an antenna array 520, and multiple pairs of RF ports 512 between the radio unit 510 and the antenna array 520. In such AIR base station 500, the pairs of RF ports 512 are connected without RF cables, as illustrated by the dotted lines. Instead, the pairs of RF ports 512 may be connected by internal cables or connectors. For example, the RF ports may plug into each other. Alternatively, the radio unit and the antenna array may be integrated directly. However, the skilled person should understand that, the proposed solutions may also be applied in normal base stations.

Further, the antenna calibration ports exist in the prior art have been removed. One coupling unit 516 is arranged within the radio unit 510. The coupling unit 516 may also be configured for VSWR detection. The radio unit 510 may comprise multiple transmit/receive (TX/RX) paths/channels (not shown) corresponding to the RF ports 512. The TX/RX paths may have the same components as those in the existing TX/RX paths for performing signal processing in the RF domain.

During UL calibration, a known UL calibration signal 550 may be injected into one RX path to be calibrated via the coupling unit 516. The UL calibration signal 550 may be generated by some device separated from the radio unit 510, for example, a UL calibration signal generator arranged within a baseband unit. Then, the UL calibration signal 550 travels through the RX path and arrives at a RX calibration unit where the UL calibration signal may be processed to estimate the transfer function of the RX path.

It should be noted that, only one RX path calibration is shown here and other RX paths may be calibrated simultaneously or sequentially.

Figure 6:
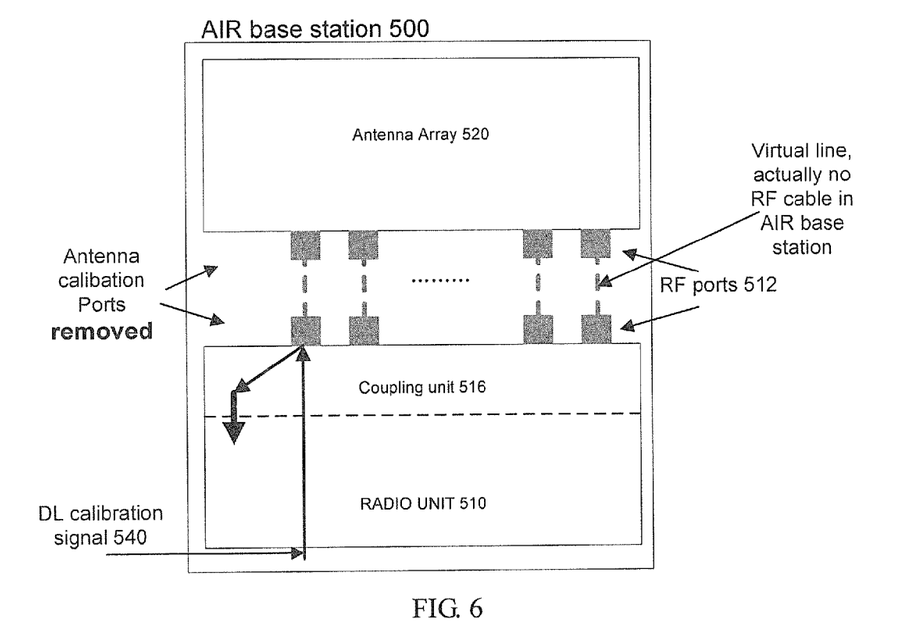
FIG. 6 schematically illustrates an AIR base station 500 and the signal flow for DL calibration based on the hardware structure according to an embodiment of the present invention.

FIG. 6 schematically illustrates the signal flow for DL calibration based on the same hardware structure within the AIR base station 500 as shown in FIG. 5.

During DL calibration, a known DL calibration signal 540 travels through one TX path to be calibrated. Also, the DL calibration signal may be generated by some device separated from the radio unit 510, for example, a DL calibration signal generator arranged within a baseband unit. The coupling unit 516 can extract the DL calibration signal from the TX path and feed it back to a TX calibration unit where the DL calibration signal may be processed to estimate the transfer function of the TX path.

Likewise, only one TX path calibration is shown here and other TX paths may be calibrated simultaneously or sequentially.

In some embodiments, the coupling unit 516 may be further configured for antenna supervision. For VSWR detection, the coupling unit 516 may be configured to extract transmit signal from the TX path during DL transmitting. That is, the coupling unit 516 can extract the forward signal and the reverse signal from the TX path, and feed these signals to an RMS power detection unit for VSWR detection. Then, the detected VSWR may be used to supervise the connection status of the radio unit and the antenna array. The RMS power detection unit may be implemented by a normal RX path within the radio unit 510, which will be described later. The skilled in the art can understand that each TX path may be detected in the same way.

Figure 7:
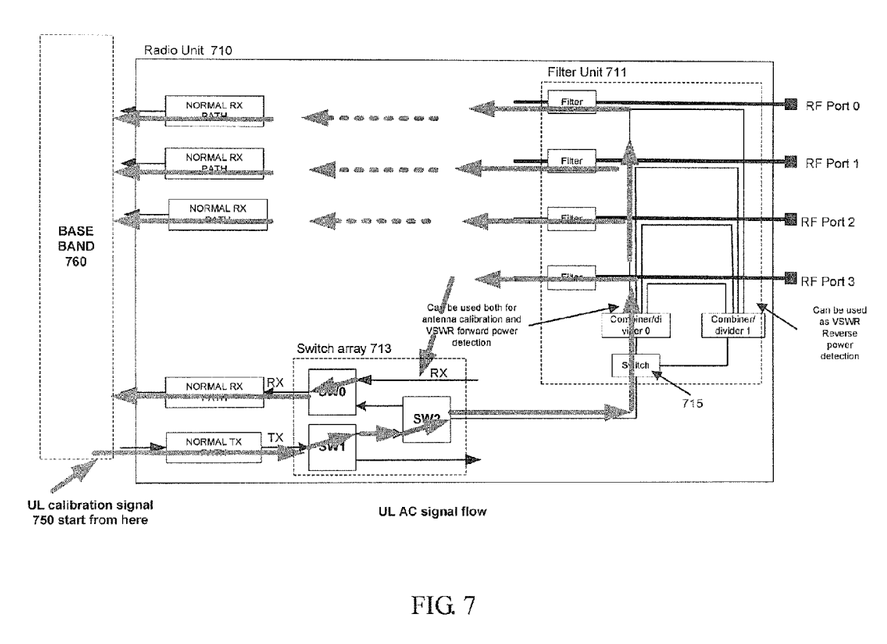
FIG. 7 illustrates the UL antenna calibration signal flow within the radio unit based on the hardware structure according to an embodiment of the present invention.

FIG. 7 illustrates in further detail the DL antenna calibration signal flow within the radio unit based on the hardware structure according to an embodiment of the present invention. A baseband unit 760 is shown in FIG. 7 for better understand the calibration signal flow.

As shown in FIG. 7, the radio unit 710 may comprise a plurality of TX/RX paths. To demonstrate the signal flow, the TX paths and the RX paths are illustrated as separate paths. However, the skilled in the art should appreciate that, depending on the operation mode (e.g., TDD or FDD), a TX path and a RX path may be a common path operated via a switch, e.g., a circulator or a duplexer. One end of the TX/RX path is connected with the baseband unit 760, and the other end is connected to a corresponding RF port, in order to transmit signal to or receive signal from the antenna array (not shown) via the RF port.

Normally, these TX/RX paths include various components for performing processing in the RF domain on the signal to be transmitted or received, for example various amplifiers such as low noise amplifier (LNA) or high power amplifier (HPA), digital-to-analog converter (DAC), analog-to-digital converter (ADC), modulator, mixer, and etc. In the figures, such TX/RX path is depicted as a normal TX/RX path.

At the end where the TX/RX paths are connected with the RF ports, a coupling unit is arranged to couple with the TX/RX paths. The coupling unit may be configured to couple a calibration signal into/out of the TX/RX paths. In some embodiments, the coupling unit may be implemented by some combiners/dividers and switches. The skilled in the art should appreciate that the coupling unit may be implemented by other components and some other arrangements.

In the embodiment as shown in FIG. 7, the coupling unit may comprise a combiner/divider 0, a combiner/divider 1, a switch 715 and a switch array 713. The combiner/divider 0 can be used both for antenna calibration and VSWR forward power detection. The combiner/divider 1 can be used for VSWR reverse power detection. Please be note that there are several possibilities of design of VSWR functionality, which gives different detailed design of the combiner/divider 0 and 1. However, regardless the detailed design, the coupler unit itself can be reused by both antenna calibration and antenna supervision.

The switch 715 is configured to switch between the combiner/divider 0 and the combiner/divider 1. The switch array 713 is configured to switch between the UL antenna calibration and the DL antenna calibration. The switch array 713 may include multiple switches for achieving some certain logical connections.

During UL calibration, a known UL calibration signal 750 may be generated in the baseband unit 760 and delivered via a normal TX path to the switch array 713. The switch array 713 guides the UL calibration signal 750 to the switch 715, which in turn directs it to the combiner/divider 0. Then, the combiner/divider 0 can inject the UL calibration signal 750 into each of the RX paths. For the TX/RX path (i.e., the reference TX/RX path) whose TX path is reused to transmit the UL calibration signal 750, the UL calibration signal may be injected into its RX path via the combiner/divider 0 and the switch array 713. As mentioned previously, the calibration of the RX paths may be performed simultaneously (as illustrated in this figure) or sequentially.

Thereafter, the UL calibration signal 750 will travel through the RX paths and arrive at a RX calibration unit within the baseband unit 760. The RX calibration unit can process the UL calibration signal and estimate the transfer function of the RX paths. The result may be used to calibrate the RX paths. For example, calibration coefficients of the RX paths may be calculated and used to correct the amplitude and phase differences among those RX paths.

Figure 8:
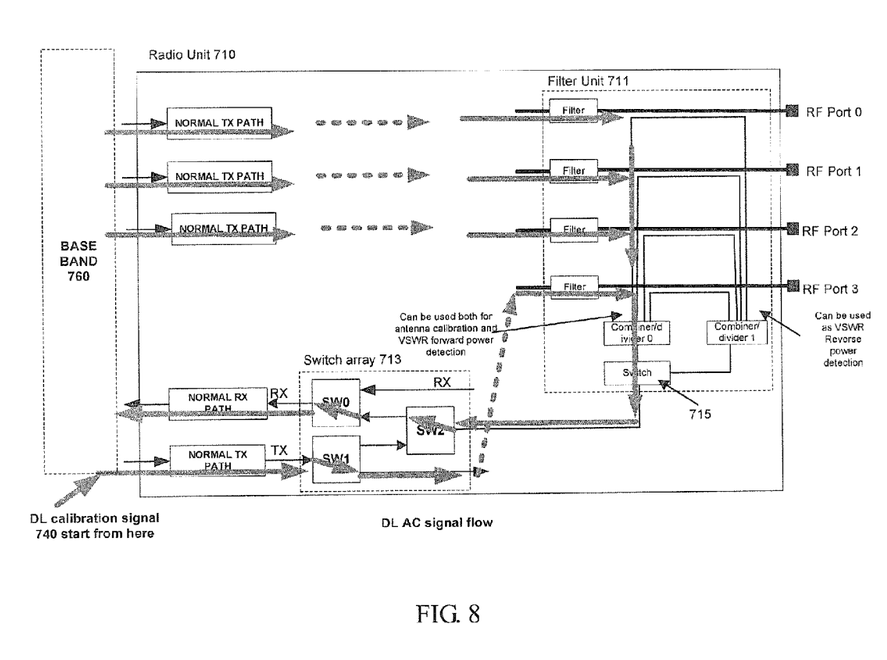
FIG. 8 illustrates the DL antenna calibration signal flow within the radio unit based on the hardware structure according to an embodiment of the present invention.

FIG. 8 illustrates in further detail the DL antenna calibration signal flow within the radio unit based on the hardware structure according to an embodiment of the present invention. The UL antenna calibration is directed to the TX paths and thus merely normal TX paths and a reused normal RX path are illustrated. Other hardware components in FIG. 8 are the same as those in FIG. 7.

During DL calibration, a known DL calibration signal 740 may be generated in the baseband unit 760 and travel through the plurality of TX paths to be calibrated. For the TX/RX path (i.e., the reference TX/RX path) of which the RX path will be reused to receive the DL calibration signal 740, the DL calibration signal may further travel via the switch array 713.

Then, the combiner/divider 0 can extract the DL calibration signal 740 from each of the TX paths. Via the switch 715 and the switch array 713, the extracted DL calibration signal 740 will be fed through the reused normal RX path to a TX calibration unit. The TX calibration unit can process the DL calibration signal and estimate the transfer function of the TX paths. The result may be used to calibrate the TX paths. For example, calibration coefficients of the TX paths may be calculated and used to correct the amplitude and phase differences among those TX paths.

In some embodiments, the coupling unit may be further configured for antenna supervision. For VSWR detection, the combiner/divider 0 may be configured to extract the forward signal from the TX path during DL transmission. On the other hand, the combiner/divider 1 may be configured to extract the reverse signal from the TX path.

In some embodiments, all these extracted signals can be fed to a reused normal RX path via the switch 715 and the switch array 713. The reused RX path will act as an RMS power detection unit for VSWR detection. Then, the detected VSWR may be used to supervise the connection status of the radio unit and the antenna array.

Depending on the operation mode adopted by the system, the detailed components used might be slightly different for each design. However, the basic structure is the same.

Figure 9:
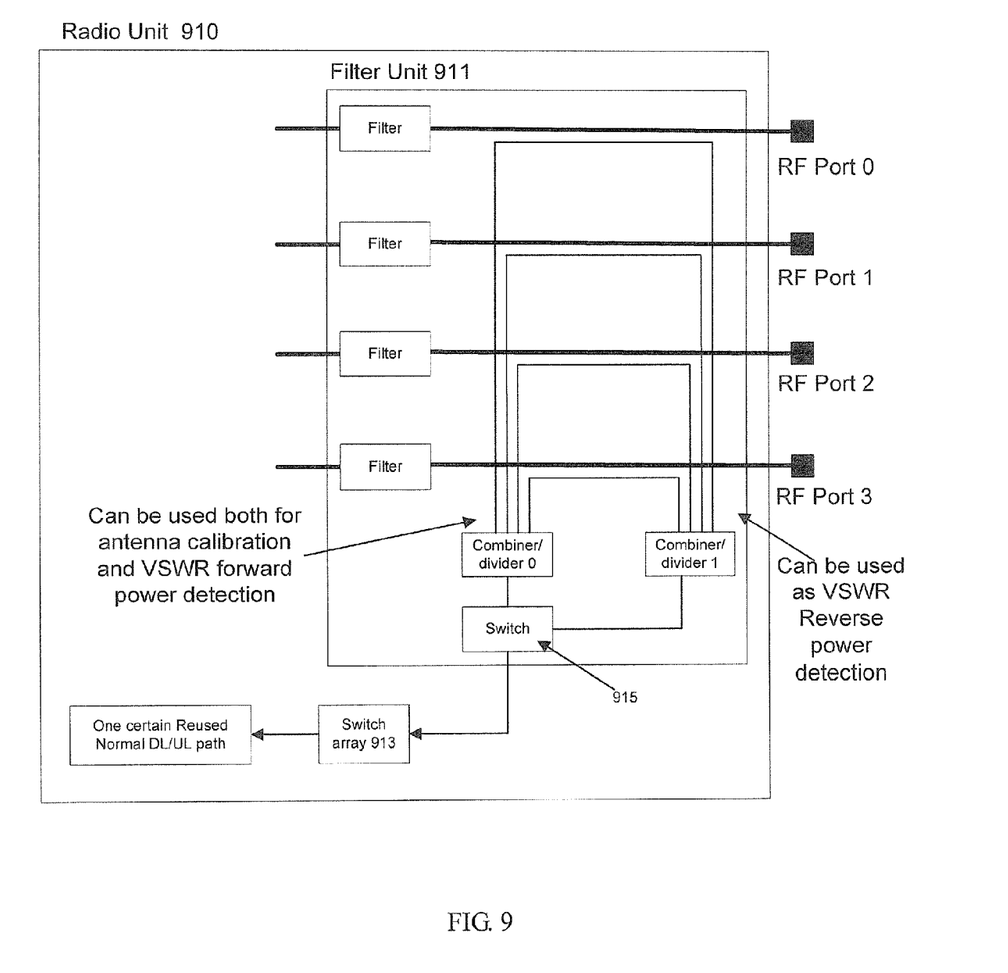
FIG. 9 illustrates a schematic hardware structure in a TDD system according to embodiments of the present invention.

FIG. 9 illustrates a schematic hardware structure of a radio unit in TDD system according to embodiments of the present invention. A four paths TDD radio unit is illustrated as an example. The skilled in the art should appreciate that there may be more or less paths in the radio unit. In the TDD system, the TX path and the RX path are illustrated as a common path, because the same frequency is used for both transmission and reception.

Similar to FIG. 7, the radio unit 910 may comprise a plurality of TX/RX paths. One end of the TX/RX path is connected with a baseband unit, and the other end (i.e., the filter unit 911) is connected to a corresponding RF port (RF port 0-3), in order to transmit signal to or receive signal from the antenna array (not shown) via the RF port.

At the filter unit 911, a coupling unit is arranged to couple with the TX/RX paths. The coupling unit is configured to couple a calibration signal into/out of the TX/RX paths. As shown in FIG. 9, the coupling unit may comprise a combiner/divider 0, a combiner/divider 1, a switch 915 and a switch array 913. The combiner/divider 0 can be used both for antenna calibration and VSWR forward power detection. The combiner/divider 1 can be used for VSWR reverse power detection. The switch 915 is configured to switch between the combiner/divider 0 and the combiner/divider 1. The switch array 913 is configured to switch between the UL antenna calibration and the DL antenna calibration. The switch array 913 may include multiple switches for achieving some certain logical connections.

In the TDD system, the switch array 913 is connected with one certain reused normal TX/RX (DL/UL) path (i.e., the reference TX/RX path). During operation, the reference TX/RX path may be reused, in a time division manner, for transmitting the UL calibration signal to the coupling unit, receiving the DL calibration signal from the coupling unit, and receiving the extracted transmit signal power (forward power and reverse power) from the coupling unit.

For example, in the TDD system, there is a Guide Period (GP) field during which there is no UL transmission or DL transmission. Then, the GP field may be used to carry out antenna calibration. The antenna supervision may be carried out during DL transmission. Because a normal TX/RX path is also reused as "a RMS power detector" by VSWR functionality, it gives more cost reduction comparing with existing down-converter solution.

Figure 10:
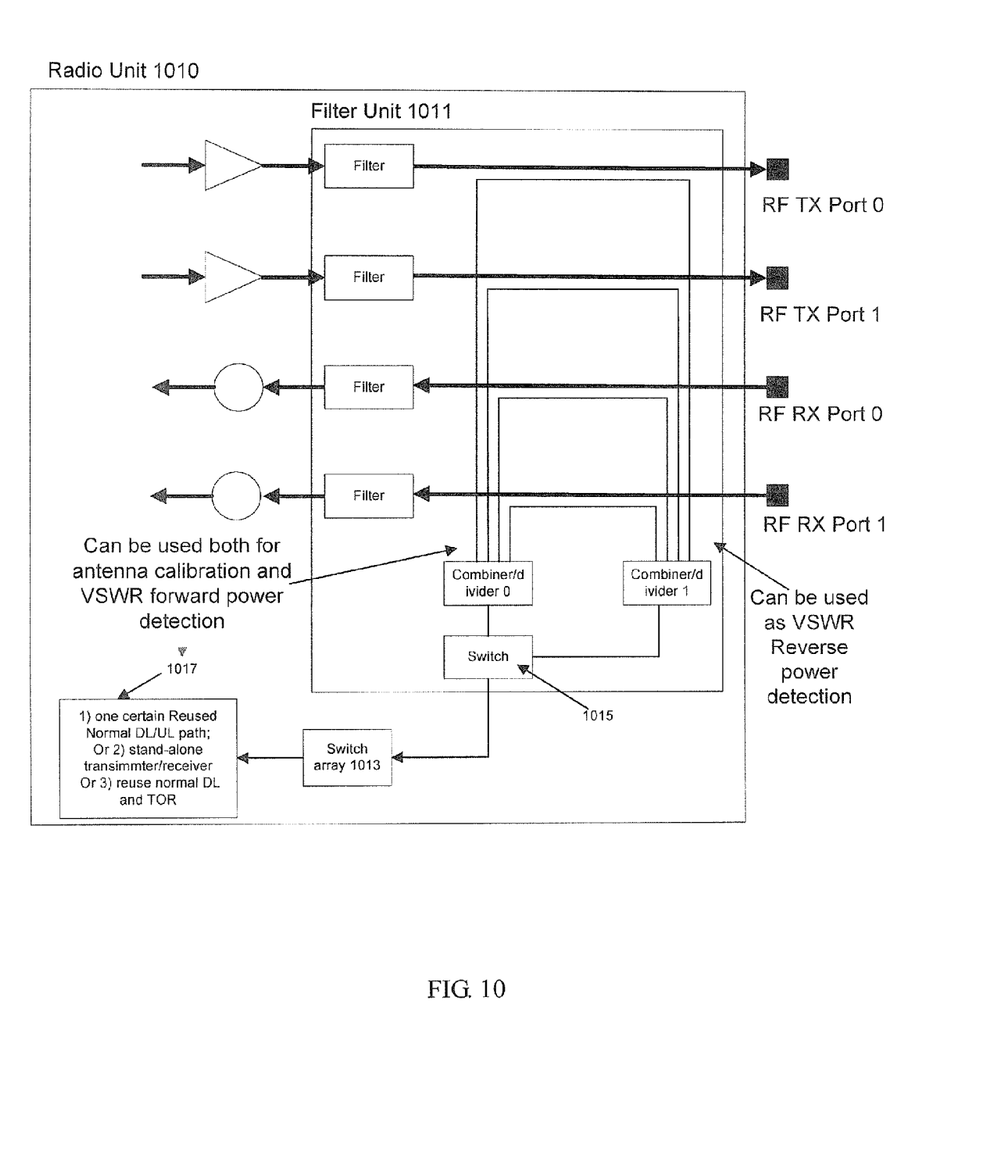
FIG. 10 illustrates a schematic hardware structure in a FDD system according to embodiments of the present invention.

FIG. 10 illustrates a schematic hardware structure of a radio unit in FDD system according to embodiments of the present invention. A two paths FDD radio unit is illustrated as an example. The skilled in the art should appreciate that there may be more or less paths in the radio unit. In the FDD system, the TX path and the RX path are illustrated as separate paths, because different frequencies are used for transmission and reception.

Likewise, the radio unit 1010 may comprise a plurality of TX/RX paths. One end of the TX/RX path is connected with a baseband unit, and the other end (i.e., the filter unit 1011) is connected to a corresponding RF TX or RX port (RF port 0-1), in order to transmit signal to or receive signal from the antenna array (not shown) via the RF port.

At the filter unit 1011, a coupling unit is arranged to couple with the TX/RX paths. The coupling unit is configured to couple a calibration signal into/out of the TX/RX paths. As shown in FIG. 10, the coupling unit may comprise a combiner/divider 0, a combiner/divider 1, a switch 1015 and a switch array 1013. The combiner/divider 0 can be used both for antenna calibration and VSWR forward power detection. The combiner/divider 1 can be used for VSWR reverse power detection. The switch 1015 is configured to switch between the combiner/divider 0 and the combiner/divider 1. The switch array 1013 is configured to switch between the UL antenna calibration and the DL antenna calibration. The switch array 1013 may include multiple switches for achieving some certain logical connections. Please be noted that the coupling unit at the RX path side actually does not have VSWR functionality, because the VSWR functionality is implemented merely on the TX paths. Such depiction is only for consistent with previous depictions.

In the FDD system, there are 3 types of possible solutions listed in the block 1017 of FIG. 10. The skilled in the art should appreciate that there might be more possible solutions depending on the specific structure of the radio unit, but the functionalities are the same as the implementation of reference channel for antenna calibration and receiving channel for VSWR detection.

In one embodiment, the switch array 1013 is connected with one certain reused normal TX/RX (DL/UL) path (i.e., the reference TX/RX path). During operation, the reference TX/RX path may be reused, by properly scheduling (e.g., in a time division manner), for transmitting the UL calibration signal to the coupling unit, receiving the DL calibration signal from the coupling unit, and receiving the extracted transmit signal power (forward power and reverse power) from the coupling unit.

In another embodiment, the switch array 1013 is connected with a stand-alone TX/RX path which is separated from the plurality of normal TX/RX paths. During operation, the stand-alone TX/RX path is used for transmitting the UL calibration signal to the coupling unit, receiving the DL calibration signal from the coupling unit, and receiving the extracted transmit signal power (forward power and reverse power) from the coupling unit. For example, the UL/DL calibration signal may be multiplexed with the normal receiving/transmitting signals, such that the normal FDD communications may be carried out almost as usual. It should be noted that the stand-alone TX/RX path may also be used in the TDD system as the reference path for antenna calibration.

In yet another embodiment, the radio unit 1010 may further comprise a transmitter observation receiver (TOR). As known by its name, the TOR is generally arranged for observing the characteristics of a transmitter. For example, the TOR is used for correcting imbalance in a transmitter analog mixer, linearizing power amplifier, or high-order modulation, etc. In this embodiment, the switch array 1013 is connected with the TOR and one TX path of the plurality of TX/RX paths. During operation, the TX path is reused for transmitting the UL calibration signal to the coupling unit; while the TOR is used for receiving the DL calibration signal from the coupling unit and receiving the extracted transmit signal power (forward power and reverse power) from the coupling unit.

The antenna calibration may be carried out every second up to about a minute time interval, because the amplitude and phase errors existing between the TX/RX paths change over time, mainly due to temperature variations.

From the above description, it can be seen that the amplitude and phase differences caused by different RF cable (between the antenna array and the radio unit) length is not calibrated, because the coupling unit is arranged within the radio unit. However, for the antenna integrated radio (AIR) base station, this problem will not be a problem at all since no RF cables between the antenna array and the radio unit.

Even if there are RF cables between the antenna array and the radio unit, current mature antenna calibration algorithm can easily handles some amplitude difference and phase difference. In addition, the phase and amplitude differences inside the antenna array may be controlled by antenna supplier. The requirement of this phase and amplitude differences are typically as maximum 1 dB and 5 degree, while current commercially used antenna usually has specification of maximum 0.7 dB and 5 degree. For example, suppose the current typical commercial antenna specification is: 1 dB for amplitude difference and 5 degree for phase difference. The corresponding maximum tolerable cable length differences are listed in Table 1.

TABLE 1

Typical RF cable length V.S phase change

| Operating frequency(MHz) | wavelength(mm) | cable length corresponding to 5 degree(mm) |
|---|---|---|
| 800 | 258.7745848 | 3.594091455 |
| 1800 | 115.0109266 | 1.59737398 |
| 2600 | 79.62294915 | 1.105874294 |
| 3500 | 59.14847652 | 0.821506618 |

Please be noted that the phase difference requirement is much tougher than the amplitude difference and thus only phase related calculation is shown here.

The typical RF cable dielectric constant is around 2.1, which gives a slight impact on the result comparing with transmission in vacuum. Current commercial antenna can control the cable length to be around 0.5 mm, which is a typical value in current commercial antennas. Thus, the cable length difference may be controlled by the antenna supplier.

As a result, compared with the traditional way of antenna calibration structure where the phase error and amplitude error at the antenna array are not controlled, in the proposed solution of the present invention, the phase error and the amplitude error of the antenna array may be in full control. Those errors may even be calibrated during production in a case where it is desired to control the phase error with even tougher requirement. Further, the temperature drifting may be compensated by proper tables, which has an advantage of longer time interval of antenna calibration.

In addition, even the phase error and the amplitude error of the antenna array may be controlled in the proposed solution, the strip line after the signal coupling point on the printed circuit board (PCB) for each path shall be intentionally adjusted to be identical.

Particular embodiments of the present invention can be implemented so as to realize one or more of the following advantages.

For antenna calibration, the benefits are mainly the cost focused. From component point of view, the cost of components can be obtained. Table 2 shows an example of cost reduction based on an 8-lobe radio unit.

| Component name | quantity | typical price/each(RMB) |
|---|---|---|
| coupler | 8 | 6 |
| N type connector | 2 | 10 |
| Surge/ligntning protection unit | 1 | 130 |
| RF cable between RRU and Antenna | 1 | 30 |
| RF cable inside radio unit | 1 | 10 |
| | Total | 238 |

From installation point of view, the installation time of one RF cable may be reduced, and the required installation space may be reduced a little bit.

Compared with current antenna used, antenna size and cost can be reduced since the antenna coupling unit has been removed while the added space in the radio unit is negligible. This is especially beneficial for the concept of Antenna Integrated Radio (AIR) base station.

In the traditional way of antenna calibration structure, the phase error and amplitude error at the antenna array part are not controlled, while in the embodiments of the present invention, the phase error and the amplitude error in this part may be completely under control. Those errors may be even calibrated during production and the temperature drifting may also be compensated by proper tables.

Comparing with the traditional structure, the insertion loss at the antenna side may be reduced because of the removing of the antenna coupling unit, and thus higher output power and better sensitivity from node level may be achieved.

For antenna supervision, there are still some added benefits.

For example, in the traditional antenna supervision solution, an independent RMS detector with a fixed and independent frequency is used, and thus there is no frequency selectivity. However, in the embodiments of the present invention, because the detected signal is the actual DL transmission signal whose frequency may be selected from a wide frequency range, the system is less sensitive with interferers of antenna VSWR supervision. Further, in the embodiments of the present invention, the VSWR detection is synchronized with the DL transmitting, more accurate power detection may be obtained on time basis. At last, the cost is lower than the traditional ways.

Exemplary embodiments of the present invention have been described above with reference to block diagrams and flowchart illustrations of methods, apparatuses (i.e., systems). While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A radio unit, comprising:
   a plurality of transmit/receive (TX/RX) paths;
   a plurality of radio frequency (RF) ports connected with the plurality of TX/RX paths;
   a coupler, coupled with the plurality of TX/RX paths and configured to inject an uplink (UL) calibration signal into at least one of the plurality of RX paths, extract a downlink (DL) calibration signal from at least one of the plurality of TX paths, and extract transmit signal power from at least one of the plurality of TX paths to supervise a connection status between the radio unit and an antenna array;

wherein the coupler comprises a switch array connected to one TX/RX path of the plurality of TX/RX paths, and the one TX/RX path is reused, in a time division manner, for transmitting the UL calibration signal to the coupler, receiving the DL calibration signal from the coupler, and receiving the extracted transmit signal power from the coupler.

2. The radio unit of claim 1, wherein the transmit signal power comprises a forward power and a reverse power.

3. The radio unit of claim 1, further comprising:
a stand-alone TX/RX path, and
the coupler comprises a switch array connected to the stand-alone TX/RX path, and the stand-alone TX/RX path is used for transmitting the UL calibration signal to the coupler, receiving the DL calibration signal from the coupler, and receiving the extracted transmit signal power from the coupler.

4. The radio unit of claim 1, when used in a frequency division duplex (FDD) system, the radio unit further comprises a transmitter observation receiver (TOR), and the coupler comprises a switch array connected to the TOR and to one TX path of the plurality of TX/RX paths, and the TX path is reused for transmitting the UL calibration signal to the coupler, and the TOR is used for receiving the DL calibration signal from the coupler and receiving the extracted transmit signal power from the coupler.

5. The radio unit of claim 1, wherein the plurality of RF ports is configured to connect to a plurality of RF ports of an antenna array without RF cables.

6. A base station, comprising:
a radio unit of claim 1;
an antenna array having a plurality of RF ports;
wherein the plurality of RF ports connected with the plurality of RF ports of the radio unit without RF cables.

7. A method for calibrating an antenna array within a base station, wherein the base station comprises a radio unit, and the radio unit comprises a plurality of TX/RX paths, a plurality of RF ports connected with the plurality of TX/RX paths, and a coupler coupled with the plurality of TX/RX paths, the method comprising:
transmitting a UL calibration signal to at least one of the plurality of RX paths via the coupler;
receiving a DL calibration signal from at least one of the plurality of TX paths via the coupler;
determining, based on at least one of the UL calibration signal and the DL calibration signal, calibration coefficients of the at least one RX path and TX path; and
extracting transmit signal power from at least one of the plurality of TX paths to supervise a connection status between the radio unit and an antenna array;
wherein one of the plurality of TX/RX paths is reused, in a time division manner, for transmitting the UL calibration signal, receiving the DL calibration signal, and extracting the transmit signal power.

8. The method of claim 7, wherein the UL calibration signal is transmitted to the coupler via one TX path of the plurality of TX/RX paths.

9. The method of claim 7, wherein the UL calibration signal is transmitted to the coupler via a stand-alone transmitter path.

10. The method of claim 7, wherein the DL calibration signal is transmitted from the coupler to one RX path of the plurality of TX/RX paths.

11. The method of claim 7, wherein the DL calibration signal is transmitted from the coupler to a stand-alone receiver path.

12. The method of claim 7, wherein the DL calibration signal is transmitted from the coupler to a transmitter observation receiver (TOR).

\* \* \* \* \*